June 27, 1939.  H. W. FINK  2,164,057

FLUID CONTROL VALVE

Filed Aug. 2, 1937

INVENTOR
HENRY W. FINK
BY Paul, Paul & Moore
ATTORNEYS

Patented June 27, 1939

2,164,057

UNITED STATES PATENT OFFICE 2,164,057

FLUID CONTROL VALVE

Henry W. Fink, Minneapolis, Minn., assignor to Tropic-Aire, Incorporated, Minneapolis, Minn., a corporation of Delaware Application August 2, 1937, Serial No. 156,983

5 Claims. (Cl. 237—12.3)

This invention relates to new and useful improvements in fluid control valves and more particularly to such a device adapted for use in connection with an automotive vehicle to control the directional flow of the heated air from the automobile heater.

An object of the present invention is to provide a control valve having means for connecting it to a suitable air outlet provided on the heater casing, and having a plurality of air discharge openings, certain of which may be adapted to direct heated air to the surface of a windshield, and another discharge opening being arranged to direct air in a downward direction towards the floor of the vehicle.

A further object is to provide a device of the class described comprising a casing having an inlet opening and a plurality of outlets, and a valve member mounted within said device and selectively operable to control the directional flow of the heated air from said device.

Other objects of the invention reside in the simple and inexpensive construction of the valve structure; in the novel arrangement of the outlets with respect to the intake of said device, and the construction of the valve member provided therein for controlling the directional flow of the air from said device; and, in the unique construction of the valve member which is so designed as to provide free and unobstructed air flow through the device, when in any selected position, and which, when in closed position, completely interrupts air flow through the device.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
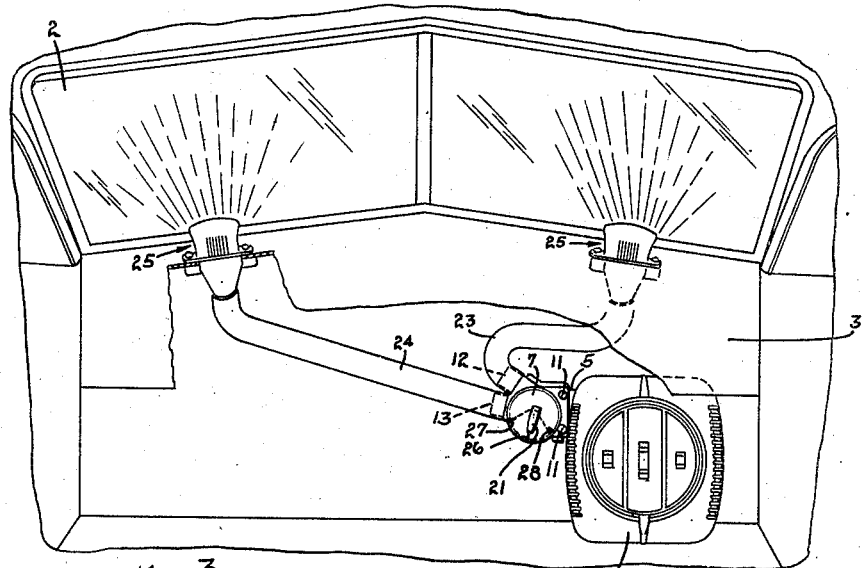
Figure 1 is a view showing a portion of the interior of an automotive vehicle comprising a heater having the novel valve structure connected to a discharge provided in the heater casing.

In the selected embodiment of the invention here shown there is illustrated in Figure 1 for purposes of disclosure a portion of an automotive vehicle comprising the usual windshield 2, instrument board 3, and heater 4. The heater is of conventional design and is provided with an auxiliary air outlet 5 whereby a portion of the heated air may be directed to a remote portion of the vehicle, such as the windshield.

Figure 2:
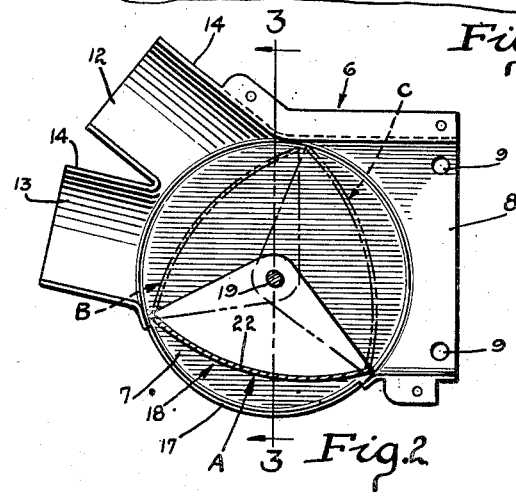
Figure 2 is an enlarged sectional view on the line 2—2 of Figure 4, showing the interior construction of the valve.
Figure 4:
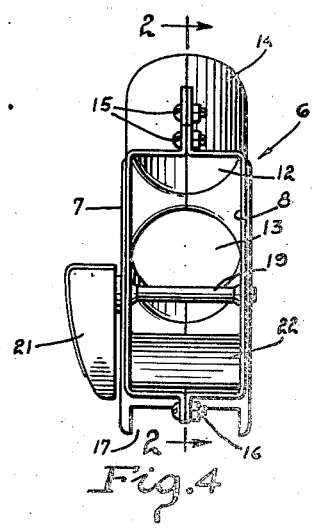
Figure 4 is an end view of Figure 2.
Figure 3:
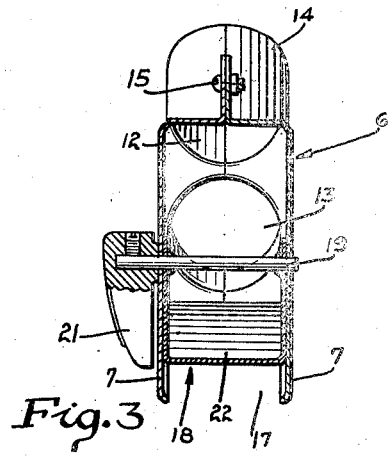
Figure 3 is a vertical sectional view on the line 3—3 of Figure 2.

An important feature of the present invention resides in the novel means provided for controlling the directional flow of heated air from the outlet 5 of the heater casing. The novel means provided for thus controlling the directional flow of the heated air from the heater is best illustrated in Figures 2, 3, and 4; and comprises a casing generally indicated by the numeral 6. This casing has a cylindrical portion 7 with an intake opening 8 adapted to be fitted over the discharge 5 of the heater as clearly illustrated in Figure 1. Suitable apertures 9 are provided in the casing 6 for receiving screws 11 whereby the valve structure may readily be secured to the heater as illustrated in Figure 1.

The casing 6 is provided with discharge openings 12 and 13, defined by cylindrical wall portions 14 shown integral with the wall of the casing 6. The casing is preferably constructed of two pieces suitably secured together as shown at 15 and 16 in Figure 4.

The cylindrical portion 7 of the casing 6 is provided in its lower portion with an opening 17 through which heated air may be directed from the valve in a downwardly direction towards the floor boards of the vehicle.

The means provided within the valve structure for controlling the flow of heated air therethrough is best illustrated in Figure 2, and comprises a valve member, generally indicated by the numeral 18. This valve member is shown secured to a suitable shaft 19 supported in bearings provided in the side walls of the cylindrical casing 7 and having a finger knob 21 whereby it may be conveniently rotated to selectively position the valve member 18.

The valve member 18, as best illustrated in Figure 2, comprises an arcuately formed wall 22, whose length is such as to span the discharge opening 17, or the two discharge openings 12 and 13, or the intake opening 8 of the valve structure. When positioned as shown in full lines in Figure 2, the heated air delivered to the valve structure from the heater, will be directed through the discharge openings 12 and 13, as will readily be understood by reference to Figure 2. The discharge openings 12 and 13 may be provided with suitable conduits 23 and 24, respectively, whose discharge ends are connected to suitable air distributing nozzles, generally indicated by the numeral 25. The nozzles 25 are shown and described in detail in Patent No. 2,154,731, and it is therefore thought unnecessary to herein disclose the same in detail.

The arcuately formed wall 22 of the valve 18 is so shaped that when in any selected position, free and unobstructed flow is obtained through the valve structure. For example, when positioned as shown at A in Figure 2, the wall 22 merely provides a closure for the opening 17 in the casing 7, and permits free and unobstructed air flow through the valve body and its outlets 12 and 13. When the arcuately formed wall 22 is positioned as shown at B in Figure 2, all of the air delivered to the valve will be directed downwardly through the opening 17, and when positioned as shown at C in Figure 2, air circulation through the valve is completely shut off.

Suitable marks 26 may be provided on the front wall of the casing 7 adapted to indicate the position of the arcuately formed wall 22 of the valve 18 whereby the operator may readily note the position of the valve. For example, when the finger knob or pointer 21 registers with the mark 26, as shown in Figure 1, the valve 18 may be positioned for defrosting the windshield. When the knob 21 is alined with the mark 27, the device will operate as a foot warmer, and when the pointer is alined with the mark 28 the valve is closed.

This novel device has been found very useful in connection with automobile heaters for controlling the directional flow of a portion of the heated air therefrom. It may be conveniently located adjacent to the heater so that the driver may readily manipulate the valve 18 when desired.

The entire device, with the exception of the shaft 19 and finger knob 21, may be constructed of sheet metal, suitably formed to provide two halves adapted to be secured together to provide a completed unit as illustrated in Figures 3 and 4. It is also to be understood that suitable friction means, not shown, is provided for frictionally holding the valve 22 in its adjusted or selected positions.

I claim as my invention:

1. A connecting structure adapted for use in an automobile between a heater and defroster unit and a plurality of defroster conduits comprising a casing having a cylindrical body portion and having a tubular intake extension adapted for connection with the defroster outlet of the heater, and further having a pair of adjacently disposed tubular defroster-air discharging extensions to each of which a defroster conduit is adapted to be connected, the cylindrical wall of said cylindrical body being cut away at a point between said intake extension and said discharge extensions to provide a discharge opening adapted to direct hot air downwardly to the floor of the automobile, said casing being formed of two sections secured together along a line perpendicular to the axis of the cylindrical body and parallel with the axes of said extensions, a valve having a valving portion adapted to close only the intake extension, or only both discharge extensions simultaneously, or only said floor discharge opening, and means for operating the valve from the outside of the casing, the casing and valve being formed of sheet metal.

2. In combination in an automobile having a heater and defroster unit having a defroster outlet extension, a valve casing having a cylindrical body portion and having a tubular defroster-air intake extension connected with said defroster outlet, and further having a pair of tubular defroster-air discharging extensions, the cylindrical wall of said cylindrical body being cut away at a point between said intake and said discharge extensions to provide a downwardly directed hot air discharge opening delivering to the floor, said casing being formed of two sections secured together along a line perpendicular to the axis of the cylindrical portion and parallel with the axes of the extensions, a valve having a valving portion adapted to close only the intake, or only both discharge extensions simultaneously or only said floor delivery opening, and a pair of defrosting air-delivery conduits, one connecting with each tubular discharge extension, said intake and discharge extensions being disposed in substantially the same vertical plane.

3. In combination in an automobile, a heater and defroster unit having a cross sectionally rectangular tubular defrosting outlet extension, a casing having a cylindrical body portion and having a cross sectionally rectangular tubular defroster air intake extension fitting and detachably connected with said rectangular tubular defroster outlet, and further having a pair of adjacently disposed tubular defroster-air discharge extensions intersecting the cylindrical wall of the body, the cylindrical wall of said body being cut away at a point between said intake and said discharge extensions to provide a downwardly directed hot air discharge opening delivering to the floor, said casing being formed of two sections secured together along a line perpendicular to the axis of the cylindrical body and parallel with the axes of said extension, a valve having a valving portion adapted to close only the intake, or only both discharge extensions simultaneously, or only said floor delivery opening, and a pair of defroster-air delivery conduits, one connecting with each tubular discharge extension.

4. In combination in an automobile, a heater and defroster unit having a defrosting outlet extension, a casing having a cylindrical body and having a defroster air intake extension fitting and detachably connected with said defroster outlet extension, and further having a pair of adjacently disposed upwardly diagonally extending defroster-air discharge extensions, the cylindrical wall of said body having at a point between said intake and said discharge extensions a downwardly directed hot air discharge opening delivering to the floor, said extensions and floor delivery opening being along a line in same vertical plane, a valve associated with said extensions and floor discharge opening so as to simultaneously close said adjacently disposed tubular extensions and establish communication between the intake extension and said floor discharge opening, so as to close the floor discharge opening and establish communication between the intake and discharge extensions, and so as to prevent intake through said intake extension to said body, and a pair of defrosting-air delivery conduits, one connected with each of the adjacently disposed discharge extensions.

5. In combination in an automobile, a heater and defroster unit having a cross sectional rectangular defrosting outlet extension, a casing having a cylindrical body and having a cross sectional rectangular defroster-air intake extension fitting and detachably connected with said defroster outlet extension and further having a pair of adjacently disposed defroster-air discharge extensions, the cylindrical wall of said body having at a point between said intake and said discharge extensions a downwardly directed hot air discharge opening delivering to the floor, said extensions and floor delivery opening being in the same vertical plane, a valve associated with said extensions and floor discharge opening so as to simultaneously close said adjacently disposed tubular extensions and establish communication between the intake extension and said floor discharge opening, so as to close the floor discharge opening and establish communication between the intake and discharge extensions, and so as to prevent intake through said intake extension to said body, and a pair of defrosting-air delivery conduits, one connected with each of the adjacently disposed discharge extensions.

HENRY W. FINK.